(No Model.)
W. H. MUNFORD.
LEVELING INSTRUMENT.
No. 308,426. Patented Nov. 25, 1884.
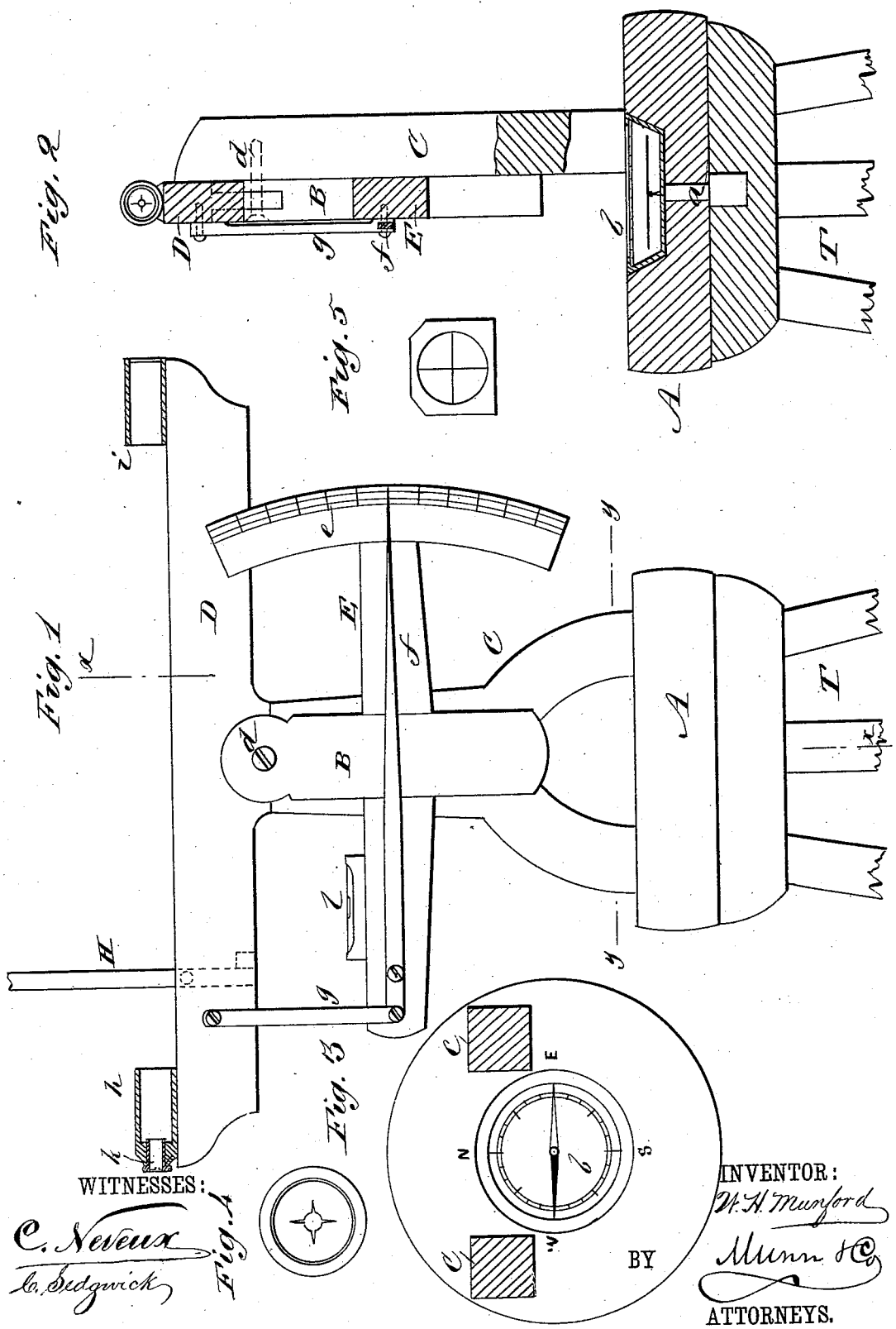
WITNESSES:
C. Neveux
C. Sedgwick
INVENTOR:
W. H. Munford
BY Munn & Co
ATTORNEYS.

UNITED STATES PATENT OFFICE.

WILLIAM H. MUNFORD, OF ANNA, OHIO.

LEVELING-INSTRUMENT.

SPECIFICATION forming part of Letters Patent No. 308,426, dated November 25, 1884.

Application filed June 6, 1884. (No model.)

*To all whom it may concern:*

Be it known that I, WILLIAM H. MUNFORD, of Anna, in the county of Shelby and State of Ohio, have invented a new and useful Improvement in Leveling-Instruments, of which the following is a full, clear, and exact description.

The object of my invention is to furnish an inexpensive instrument that can be readily and conveniently used for leveling; and it consists in the instrument constructed as hereinafter described and claimed.

Reference is to be had to the accompanying drawings, forming a part of this specification, in which similar letters of reference indicate corresponding parts in all the figures.

Figure 1 is a side elevation, partially sectional, of my improved instrument. Fig. 2 is a vertical section on line $x\ x$ of Fig. 1. Fig. 3 is a horizontal section on line $y\ y$ of Fig. 1. Fig. 4 is an enlarged end view of the eye-piece, and Fig. 5 is an end view of the sight-tube $i$, showing the crossed wires.

A is the base, held upon the top of a tripod, T, by a pin, $a$, that the base turns on. In a recess in the base is fitted a compass, $b$, for use in obtaining right angles. C is a standard fixed to the base.

D is a bar pivoted to one side of standard C.

B is a hanger mortised into the bar D, and held by the same pivot-screw, $d$, by which bar D is attached to the standard, so that both parts B D may swing independently.

E is a bar attached to hanger B and forming side arms thereto, one of which carries a scale-bar, $e$, while to the other end of the bar is pivoted a pointer, $f$, that is connected by a link, $g$, to the top bar D. This top bar, D, carries front and rear sight-tubes, $h\ i$, the latter of which is fitted with crossed wires, and the former with an eye-piece, $k$, consisting of a disk of metal with a central hole and radial notches. These notches are vertical and horizontal, and they enable a person to sight very correctly in connection with the crossed wires, as the crossed wires will be centered with respect to the central aperture when they are in alignment with the said notches. Where a centrally-apertured disk was used without the notches the central part of the aperture with respect to the crossed wires was more difficult to determine, as the horizontal and vertical central lines of the apertures had to be imagined, whereas they are plainly indicated now by the notches. This is put in the end of the tube $h$, and insures accuracy in sighting. The bar D is also provided with rod H, for use in obtaining perpendiculars, which is pivoted to allow its adjustment and of its being turned down out of the way when not in use.

In use, the instrument being planted, hanger B is turned to the right or left to level the bar E, which is determined by placing a pocket-level on the bar, as shown at $l$. The end of the pointer $f$ is then brought to the zero-point on the scale $e$ and bar D thus moved to the level. If a line is to be run with a rise or fall, the pointer will be correspondingly adjusted to the scale. The scale, being properly proportioned to the adjustable parts of the instrument, may also be used for measuring altitudes and distances.

I am aware that sight-tubes have been provided with vertical and horizontal crossed wires, and that an eye-piece has been provided with a central aperture without notches, and I claim, broadly, no such construction. My notched disk, in connection with the crossed wires, enables a person to sight with greater precision than where an aperture only is used with said wires.

Having thus described my invention, I claim as new and desire to secure by Letters Patent—

1. A leveling-instrument consisting of turning standard C, pivoted bar D, pivoted hanger B, bar E, and pointer $f$, pivoted on bar E, and connected to bar D, substantially as described.

2. In a leveling-instrument, the combination, with adjustable bar D, of the independently-adjustable bar E, pivoted pointer $f$, and link $g$, substantially as described.

3. The combination of eye-piece $k$, having a disk provided with a central aperture having vertical and horizontal notches communicating therewith, with the sight-tube $i$, provided with a horizontal and a vertical wire crossed at their centers, and in alignment with the center of the apertured disk and its notches, substantially as set forth.

WILLIAM H. MUNFORD.

Witnesses:
R. D. MEDE,
P. W. YOUNG.